United States Patent
Kuegler et al.

(10) Patent No.: US 9,215,230 B2
(45) Date of Patent: Dec. 15, 2015

(54) METHOD FOR AUTHENTICATION, RF CHIP DOCUMENT, RF CHIP READER AND COMPUTER PROGRAM PRODUCTS

(75) Inventors: Dennis Kuegler, Bonn (DE); Jens Bender, Bonn (DE)

(73) Assignee: FEDERAL REPUBLIC OF GERMANY REPRESENTED BY FEDERAL MINISTRY OF THE INTERIOR REPRESENTED BY BUNDESAMT FUER SICHERHEIT IN DER INFORMATIONSTECHNIK (BSI), Bonn (DE)

( * ) Notice: Subject to any disclaimer, the term of this patent is extended or adjusted under 35 U.S.C. 154(b) by 3 days.

(21) Appl. No.: 14/003,721

(22) PCT Filed: Mar. 9, 2012

(86) PCT No.: PCT/EP2012/001076
§ 371 (c)(1),
(2), (4) Date: Feb. 5, 2014

(87) PCT Pub. No.: WO2012/119790
PCT Pub. Date: Sep. 13, 2012

(65) Prior Publication Data
US 2014/0157385 A1     Jun. 5, 2014

(30) Foreign Application Priority Data
Mar. 10, 2011 (DE) .......... 10 2011 013 562

(51) Int. Cl.
| | |
|---|---|
| *G06F 7/04* | (2006.01) |
| *G06F 17/30* | (2006.01) |
| *H04L 29/06* | (2006.01) |
| *H04L 9/32* | (2006.01) |
| *H04L 9/08* | (2006.01) |

(52) U.S. Cl.
CPC .......... *H04L 63/0823* (2013.01); *H04L 9/0844* (2013.01); *H04L 9/3226* (2013.01); *H04L 9/3263* (2013.01); *H04L 63/083* (2013.01)

(58) Field of Classification Search
CPC ... H04L 9/0861; H04L 9/0816; H04L 9/0825; H04L 9/083; H04L 9/0838; H04L 9/30; H04L 9/3263; H04L 9/321; H04L 2463/082
USPC .......... 726/2, 3, 4, 5, 7, 9, 10, 16, 18, 19, 20; 713/168, 169, 170, 171, 172, 173, 174
See application file for complete search history.

(56) References Cited

U.S. PATENT DOCUMENTS

| | | | |
|---|---|---|---|
| 7,356,688 B1 * | 4/2008 | Wang ........................... | 713/153 |
| 2007/0186099 A1 | 8/2007 | Beck et al. | |

(Continued)

OTHER PUBLICATIONS

Anonymous: "BSI TR-03110-1 Advanced Security Mechanisms for Machine Readable Travel Documents, Parts 1, 2, and 3", Ver. 2.10; Mar. 20, 2012, 132 pages.

(Continued)

*Primary Examiner* — Tae Kim
(74) *Attorney, Agent, or Firm* — Rothwell, Figg, Ernst & Manbeck, P.C.

(57) ABSTRACT

An authentication method for trusted communication between a first party (A) and a second party (B) is intended to be efficient and secure.

For this purpose, provision is made to combine password-based authentication and certificate-based authentication. For certificate-based authentication, the first party (A) has a static key pair consisting of a private static key and a public static key and a certificate for the public static key issued by a certification body (C). The certification body (C) is assigned a public key which is known by the second party (B). During the certificate-based authentication, the party A calculates a transformation between its own ephemeral key pair from the password-based authentication and its own static key pair from the certificate-based authentication so as to obtain a transformation parameter for carrying out the transformation. The practice of reusing the party's own ephemeral key pair from the password-based authentication in the certificate-based authentication reduces the overall calculation and communication complexity, on the one hand, and links the two protocols, on the other hand, thus ensuring that both protocols are executed by the same party. This increases the security while simultaneously reducing the complexity.

The novel method is suitable for authenticating electronic passports.

8 Claims, 3 Drawing Sheets

(56) References Cited

U.S. PATENT DOCUMENTS

| | | | |
|---|---|---|---|
| 2008/0219444 A1* | 9/2008 | Benteo et al. | 380/255 |
| 2012/0102546 A1* | 4/2012 | Jiang et al. | 726/3 |
| 2012/0284518 A1* | 11/2012 | Walker et al. | 713/171 |

OTHER PUBLICATIONS

Dagdelen et al., "Security Analysis of the Extended Access Control Protocol for Machine Readable Travel Documents," Oct. 25, 2011, Information Securitiy, Springer Berlin Heidelberg, Berlin, Heidelberg, pp. 54-68, XP019169816.

Coron et al., "Supplemental Access Control (PACE v2): Security Analysis of PACE Integrated Mapping," International Association for Cryptologic Research, Bd. 20110607:150018,Feb. 1, 2011, (18 pages), XP061 004676.

Search Report issued for European Patent Application No. 12711561.6 dated Sep. 5, 2014, along with machine English translation (11 pages).

\* cited by examiner

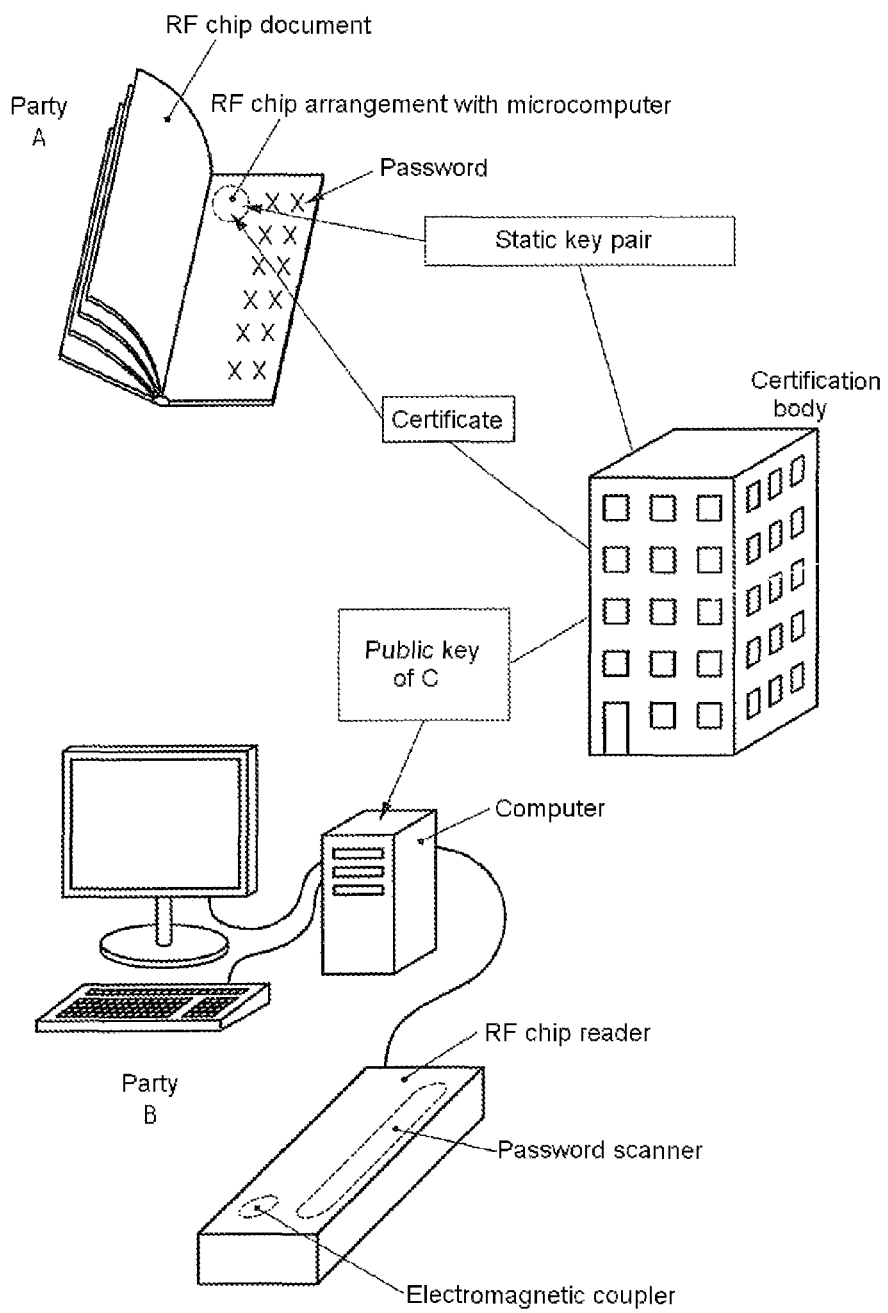

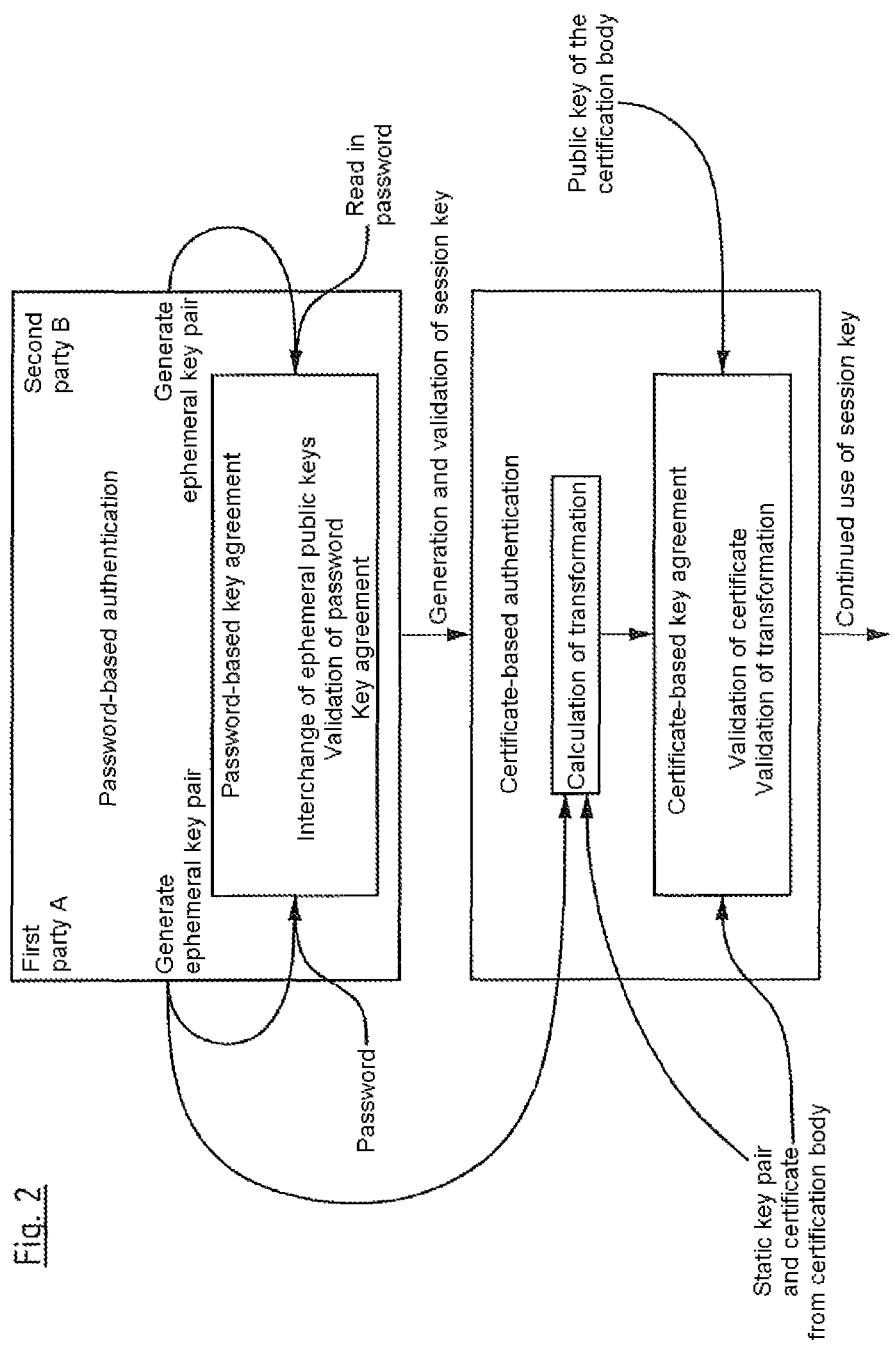

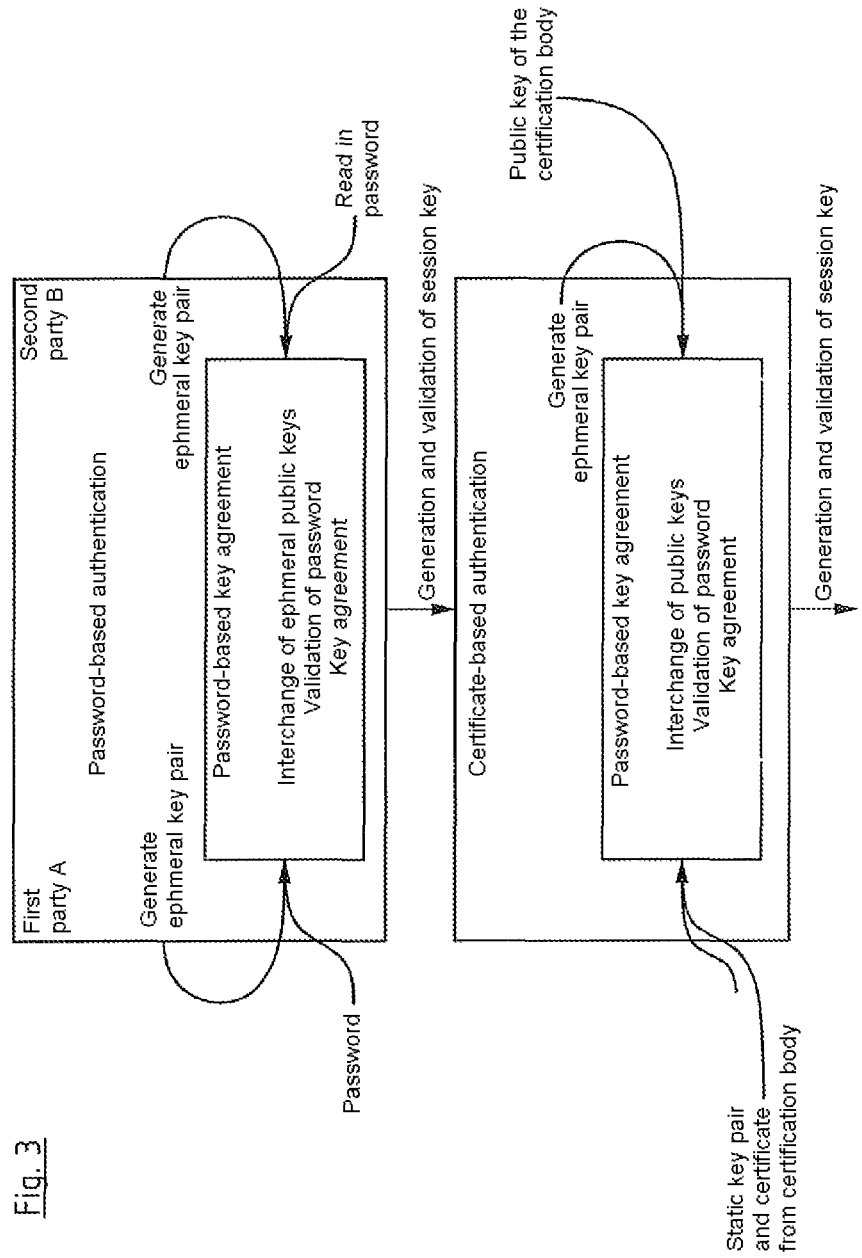

METHOD FOR AUTHENTICATION, RF CHIP DOCUMENT, RF CHIP READER AND COMPUTER PROGRAM PRODUCTS

CROSS REFERENCE TO RELATED APPLICATION(S)

This application is a 35 U.S.C. §371 National Phase Entry Application from PCT/EP2012/001076, filed Mar. 9, 2012, designating the United States and claims priority to German Application 10 2011 013562.6 filed Mar. 10, 2011. The disclosures of the referenced applications are incorporated herein in their entirety by reference.

Trusted communication between a first party and a second party requires mutual authentication. The invention relates to an authentication method, an RF chip document, an RF chip reader and computer program products.

Two authentication methods are known, in principle: password-based authentication, on the one hand, and certificate-based authentication, on the other hand.

The password-based authentication includes the Password Authenticated Connection Establishment (PACE), described in detail in the technical guideline TR-03110 Version 2.05 from the Federal Office for Information Security "Advanced Security Mechanisms for Machine Readable Travel Documents". This is a password-based key agreement. The password-based key agreement comprises the following steps: A first party and a second party each generate an ephemeral key pair consisting of a private ephemeral key and a public ephemeral key, each interchange the public ephemeral key and validate the latter using a common password, generate and then validate a session key, on the basis of which a secure communication channel is established.

For the certificate-based authentication, a first party has a static key pair consisting of a private static key and a public static key and a certificate for the public static key issued by a certification body. The certification body is assigned a public key which is known by the second party. The certificate-based authentication is based on the fact that the affiliation of the static key pair with the first party is confirmed by a trusted third party, the certification body, in the form of a certificate. For this purpose, the certificate contains at least the public static key, the unique identity of the first party and an electronic signature of these data by the certification body. The signature can be verified using the public key of the certification body. During subsequent authentication, the second party can check whether the first party has the private key associated with the public static key contained in the certificate. Known methods for the certificate-based authentication include the "Chip authentication", described in detail in the technical guideline TR-03110 Version 2.05 from the Federal Office for Information Security "Advanced Security Mechanisms for Machine Readable Travel Documents".

The abovementioned guideline TR-03110 also discloses a method which is a combination of password-based authentication and certificate-based authentication. This combination is required, inter alia, when the identity of at least one party is confidential. Authorization to communicate is only granted through knowledge and proof of a common password. This common password is usually distributed between the communication partners via a special channel, often of narrow bandwidth. The first party may be assigned an RF chip document with an RF chip on which confidential data are stored. The second party may be assigned a reader for the RF chip document. The common password may be printed on the RF chip document and may be transmitted to the RF chip reader via an optical scanner.

Following the password-based authentication, both parties each know that they are securely communicating with another party who has the same password but do not know who the other party actually is. This is problematic, in particular, when group passwords are used, with the result that the passwords are not uniquely allocated for a respective combination of two parties.

Subsequent certificate-based authentication can then be used to determine the unique identity of a party. The practice of carrying out the certificate-based authentication after the password-based authentication has the advantage that the identity of the authenticating party is disclosed only when it has been determined that both parties are in principle authorized to communicate with one another since both use the same password. On account of the encryption and integrity protection of the channel by means of the password-based key agreement, third parties also cannot see a certificate which is interchanged. Furthermore, the password-based key agreement also ensures that the password used is protected from discernment by third parties.

The previous implementation executes the two authentication methods completely in succession. This is illustrated in FIG. 3. Ephemeral key pairs are generated and used both in the password-based key agreement and in the certificate-based authentication.

The generation of the key pairs and the use of the public keys of the ephemeral key pairs, in particular, are computation-intensive and the necessary interchange of the public keys of the ephemeral key pairs requires additional communication between the parties.

Another problem of sequential execution is the missing link between both protocols, with the result that it is not ensured that both protocols have each been carried out by the same party.

The invention is based on the object of designing an authentication method for trusted communication to be efficient and secure.

This object is achieved, according to the invention, by the features of method claim 1. The object is also achieved by each of coordinate claims 5, 6, 7 and 8 which are directed to the independent production products of an RF chip document, a computer program product for the RF chip document, an RF chip reader and a computer program product for the RF chip reader.

According to featured of claim 1, a party A calculates a transformation between its own ephemeral key pair from the password-based authentication and its own static key pair from the certificate-based authentication so as to obtain a transformation parameter. The practice of reusing the party's own ephemeral key pair from the password-based authentication in the certificate-based authentication reduces the overall calculation and communication complexity, on the one hand, and links the two protocols, on the other hand, thus ensuring that both protocols are executed by the same party. This increases the security while simultaneously reducing the complexity.

The advantages achieved with the invention are that the time needed to carry out both protocols is considerably reduced. The practice of calculating and applying the transformation is considerably more efficient than creating a further ephemeral key pair again and then carrying out the authentication. With great advantage, the practice of carrying out the second key agreement is completely dispensed with and the key agreement from the password-based authentication continues to be used. The two protocols are linked by the fact that the knowledge both of the ephemeral private key from the password-based key agreement and of the static private key from the certificate-based authentication is needed to calculate the transformation.

A first independent production product is an RF chip document having a microcomputer with a microcomputer memory in such a manner that the microcomputer memory stores a first computer program which is designed in such a manner that the method can be carried out with respect to the party A.

A first computer program product which has a computer-readable medium comprises a program code for implementing the first computer program in the microcomputer memory. A computation system which is used when producing the RF chip document is used for this purpose.

A second independent production product is an RF chip reader having a computer with a computer memory in such a manner that the computer memory stores a second computer program which is designed in such a manner that the method can be carried out with respect to the party B.

A second computer program product which has a computer-readable medium comprises a program code for implementing the second computer program in the computer memory of the computer of the RF chip reader.

According to one advantageous refinement of the invention, in step d) of claim 1, the private static key is mapped to the private ephemeral key in order to calculate the transformation parameter. This simplifies the calculation since all calculations which are directly dependent on the static key can be precalculated once.

According to another advantageous refinement of the invention, in step d) of claim 1, an additional random number which cannot be influenced by the first party is used to calculate the transformation parameter. The additional random number may be a number which is transmitted by the second party to the first party. This refinement has the advantage that the calculation of the transformation parameter is not solely based on the ephemeral and static key pairs associated with the first party but also depends on a value which is not under the control of the first party. The security of the method is therefore increased.

According to another advantageous refinement of the invention, with respect to step f) of claim 1, the second party applies the received transformation parameter only to one of the two public keys associated with the first party and checks the correctness of the obtained transformed public key by checking for equivalence between the transformed public key and the other public key associated with the party. As a result of the fact that the transformation is applied only to one of the two public keys associated with the first party, the calculation complexity is low. The calculation complexity would be higher if the transformation parameter were applied to both public keys associated with the first party. Two transformed public keys would then be obtained. Respective correctness of the two transformed public keys could be checked by checking for equivalence between the two transformed public keys.

Exemplary embodiments of the invention are explained in more detail below using the drawings, in which:

FIG. 1 shows a sketch of interaction of a first party, a second party and a certification body;

FIG. 2 shows a flowchart of an authentication sequence;

FIG. 3 shows a flowchart of an authentication sequence according to the prior art.

FIG. 1 illustrates an authentication system for trusted communication between a first party A and a second party B. The system comprises an RF chip document and an RF chip reader. The RF chip document is assigned to the first party A and the RF chip reader is assigned to the second party B. The RF chip document comprises a microcomputer with a microcomputer memory. The microcomputer memory stores a first computer program which is designed in such a manner that an authentication method can be carried out with respect to the party A. The first computer program was implemented in the microcomputer memory using a first computer program product.

The RF chip reader comprises a computer with a computer memory. The computer memory stores a second computer program which is designed in such a manner that the method can be carried out with respect to the party B. The second computer program was implemented in the computer memory using a second computer program product.

With respect to the party A, the RF chip document is a passport. With respect to the party B, the RF chip reader is a device for border officials. A certification body C is the producer and, at the same time, issuer of the passport.

The authentication method is a combination of password-based authentication and certificate-based authentication. For the certificate-based authentication, the first party A has a static key pair and a certificate issued by the certification body C.

The second party B knows the public key of the certification body C. Based on the present exemplary embodiment, the public key of the certification body C is stored in the computer memory of the computer of the RF chip reader.

As shown in FIG. 2, password-based authentication is first of all carried out. The password-based authentication is carried out using the PACE protocol defined in the technical guideline TR-03110 Version 2.05 from the Federal Office for Information Security "Advanced Security Mechanisms for Machine Readable Travel Documents".

It is generally the case that key pairs based on discrete logarithms are used. The private key x is a random number in each case in the range from 1 to q−1, where q is the order of the generator g of the mathematical group used (for example the multiplicative group of a finite body or the additive group of the points of an elliptical curve). The associated public key y is calculated using: $y=g^{\wedge}x$. The exponentiation ($^{\wedge}$) is the x number of times the group operation (*) is applied, starting with the generator g.

The steps of the password-based authentication are as follows:

a) The first party A and the second party B each generate an ephemeral key pair consisting of a private ephemeral key and a public ephemeral key. $xe_A$ is used below as an abbreviated designation for the private ephemeral key associated with the party A. The public ephemeral key associated with the party A is denoted $ye_A$ below. $xe_B$ and $ye_B$ represent the private and public ephemeral keys associated with the party B. The ephemeral key pairs $xe_A$ with $ye_A$ and $xe_B$ with $ye_B$ are suitable for a Diffie-Hellman key agreement.

b) The first party A and the second party B each interchange the public ephemeral key and validate the latter using a common password. Validation is effected by carrying out the PACE protocol. With regard to FIG. 1, the common password is stored in the RF chip arrangement of the RF chip document with respect to the party A. The common password is also printed on the RF chip document. The party B is aware of the common password using a password scanner of the RF chip reader.

c) The first party A and the second party B generate and validate a session key, on the basis of which a secure communication channel is established. This is effected on the basis of a common secret established in the PACE protocol.

Certificate-based authentication is then carried out.

A first exemplary embodiment and a second exemplary embodiment are described in this respect.

The steps of the first exemplary embodiment of the certificate-based authentication are as follows:

d) The first party A calculates a transformation between its own ephemeral key pair from the password-based authentication and its own static key pair from the certificate-based authentication so as to obtain a transformation parameter.

The private static key $xs_A$ is mapped to the private ephemeral key $xe_A$ in order to calculate the transformation parameter. This is bijective mapping. The transformation t is calculated using the formula: $t=xe_A*xs_A^{(-1)}$. In the present first exemplary embodiment, the transformation parameter is the calculated value t. The inverse of the static private key $xs_A^{(-1)}$ is calculated only once and is not calculated again during each authentication process. The transformation is a bijective transformation.

e) The first party A transmits the transformation parameter, here given by the value t determined in step d, together with the certificate issued by the certification body C, to the second party B via the secure communication channel.

f) The second party B applies the received transformation parameter to the public static key $ys_A$ associated with the first party A and contained in the certificate and thus obtains a transformed public key $yt_A$. The formula for this is as follows: $yt_A=ys_A^t$. The correctness of the transformed public key $yt_A$ should now be checked. For this purpose, the second party checks for equivalence between the public transformed key $yt_A$ associated with the party A and the public ephemeral key $ye_A$ associated with the first party A and previously interchanged in the password-based authentication. The second party checks: $ye_A=yt_A$.

Unlike in the present exemplary embodiment, the second party B could also apply the received transformation parameter to the public ephemeral key $ye_A$ associated with the first party A and could check the correctness of the obtained transformed public key by checking for equivalence between the transformed key and the public static key $ys_A$ associated with the party A.

g) The second party B validates the certificate received from the first party A using the public key of the certification body C.

The steps of the second exemplary embodiment of the certificate-based authentication are as follows:

d) The first party A calculates a transformation between its own ephemeral key pair from the password-based authentication and its own static key pair from the certificate-based authentication so as to obtain a transformation parameter.

In contrast to the first exemplary embodiment, a random number c which cannot be influenced by the party A is additionally used to calculate the transformation. For example, the second party B can previously transmit a random number c to the party A or the random number c could be deterministically calculated from the protocol sequence, for example by applying a hash function to the ephemeral public key associated with the party B.

The first party A calculates the transformation t using: $t=xe_A-c*xs_A$.

In the present second exemplary embodiment, the transformation parameter is a tuple with the value of the random number c and the transformation value. The tuple is abbreviated using: (c, t).

e) The first party A transmits the transformation parameter (c, t), together with the certificate issued by the certification body C, to the second party B via the secure communication channel. Since the party B knows the random number c, it is sufficient if the first party transmits only the transformation value t to the party B.

f) The second party B applies the received transformation parameter (c, t) to the static public key $ys_A$ associated with the first party A and contained in the certificate and thus obtains a transformed public key $yt_A$. The formula for this is as follows: $yt_A=g^t*ys_A^c$. The correctness of the transformed public key $yt_A$ should now be checked. For this purpose, the second party checks for equivalence between the public transformed key $yt_A$ associated with the party A and the public ephemeral key $ye_A$ associated with the first party A and previously interchanged in the password-based authentication. The second party checks: $ye_A=yt_A$.

g) The second party B validates the certificate received from the first party A using the public key of the certification body C.

The invention claimed is:

1. An authentication method for trusted communication between a chip document and a card reader by combining password-based authentication and certificate-based authentication in such a manner that, for the certificate-based authentication, the chip document has a static key pair consisting of a private static key and a public static key and a certificate for the public static key issued by a certification body and the certification body is assigned a public key which is known by the card reader, the chip document including a first processor and a first memory, the card reader including a second processor and a second memory, the method comprising:

a password-based authentication process that includes the chip document and the card reader performing the following steps:
a) each generating an ephemeral key pair consisting of a private ephemeral key and a public ephemeral key,
b) each interchanging the public ephemeral key and validating the latter using a common password stored in the first memory and the second memory, and
c) each generating and validating a session key, on the basis of which a secure communication channel is established; and a certificate-based authentication process including the following steps:
d) the chip document calculating, to obtain a transformation parameter, a transformation between its own ephemeral key pair from the password-based authentication process and the static key pair from the certificate-based authentication,
e) the chip document transmitting, to the card reader via the secure communication channel, the transformation parameter and the certificate issued by the certification body
f) the card reader applying the received transformation parameter to the public ephemeral key and/or the public static key associated with the chip document to obtain at least one transformed public key, the correctness of which is checked, and g) the card reader validating the certificate received from the chip document using the public key associated with the certification body.

2. The method as claimed in claim 1 wherein, in step d), the private static key is mapped to the private ephemeral key in order to calculate the transformation parameter.

3. The method as claimed in claim 1 wherein, in step d), an additional random number which cannot be influenced by the chip document is used to calculate the transformation parameter.

4. The method as claimed in claim 1, wherein in step (f), the card reader applies the received transformation parameter only to one of the two public keys associated with the chip document and checks the correctness of the obtained transformed public key by checking for equivalence between the transformed key and the other public key associated with the chip document.

5. A chip document comprising:
   a microcomputer; and
   a microcomputer memory containing instructions that cause the microcomputer to perform:
   a password-based authentication process that includes:
   a) generating an ephemeral key pair consisting of a private ephemeral key and a public ephemeral key,
   b) providing the public ephemeral key to a card reader and receiving a public ephemeral key from the card reader;
   c) validating the public ephemeral key received from the card reader using a common password stored in the microcomputer memory,
   d) generating and validating a session key, on the basis of which a secure communication channel is established with the card reader: and a certificate-based authentication process that includes:
   e) calculating to obtain a transformation a parameter, a transformation between its own ephemeral key pair from the password-based authentication process and a static key pair of the chip document consisting of a private static key and a public static key and the chip document having a certificate for the public static key issued by a certification body, the certification body assigned a public key known by the card reader,
   f) transmitting, to the card reader via the secure communication channel, the transformation parameter and the certificate issued by the certification body, so that the card reader applies the received transformation parameter to the public ephemeral key and/or the public static key to obtain at least one transformed public key, the correctness of which is checked, and the card reader validates the certificate received from the chip document using the public key associated with the certification body.

6. A card reader comprising:
   a computer; and
   a computer memory containing instructions that cause the computer to perform:
   a password-based authentication process that includes:
   a) generating an ephemeral key pair consisting of a private ephemeral key and a public ephemeral key,
   b) providing the public ephemeral key to a chip document and receiving a public ephemeral key from the chip document,
   c) validating the public ephemeral key received from the chip document using a common password stored in the computer memory,
   d) generating and validating a session key, on the basis of which a secure communication channel is established with the chip document; and
   a certificate-based authentication process that includes:
   e) applying a transformation parameter received from the chip document to the public ephemeral key and/or a public static key of the chip document to obtain at least one transformed public key, the correctness of which is checked,
   f) validating a certificate received from the chip document using a public key associated with a certification body, and
   g) receiving from the chip document, the transformation parameter calculated as a transformation between its own ephemeral key pair from the password-based authentication process and a static key pair of the chip document, via the secure communication channel, and the certificate for the public static key issued by the certification body, the static key pair of the chip document consisting of a private static key and the public static key and the certificate for the public static key issued by the certification body, wherein the certification body is assigned the public key known by the card reader.

7. A method for trusted electronic communication between a first digital device and a second digital device, the first digital device including a first processor and a first memory, the second digital device including a second processor and a second memory, the method comprising the steps of:
   a) generating, by said first digital device, an ephemeral key pair consisting of a private ephemeral key and a public ephemeral key;
   b) interchanging , by said first digital device, the public ephemeral key with a public ephemeral key generated by the second digital device;
   c) validating the public ephemeral key using a common password stored in both the first memory and the second memory;
   d) generating, at the first digital device, a session key on the basis of which a secure communication channel is established;
   e) calculating, by the first digital device, a transformation between its ephemeral key pair and a static key pair of the first digital device consisting of a private static key and a public static key, wherein a certificate for the public static key issued by a certification body, the certification body assigned a public key known by the second digital device; and
   f) the first digital device transmitting, to the second digital device via the secure communication channel, the transformation parameter and the certificate issued by the certification body, so that the second digital device can apply the received transformation parameter to the public ephemeral key and/or the public static key to obtain at least one transformed public key, the correctness of which is checked, and electronically validate the certificate received from the first digital device using the public key associated with the certification body.

8. The method according to claim 7, wherein the first digital device is a chip document and the second digital device is a card reader.

* * * * *